United States Patent [19]

Boyer

[11] 4,011,951
[45] Mar. 15, 1977

[54] BRACKET FOR SMALL ANIMAL FEEDER

[76] Inventor: Richard J. Boyer, Rte. No. 1, Eagle Bend, Minn. 56446

[22] Filed: Feb. 2, 1976

[21] Appl. No.: 654,619

[52] U.S. Cl. .............................. 211/71; 119/51.5; 119/61; 211/88; 248/221.2; 248/311.1
[51] Int. Cl.² ................... A47G 29/00; A47K 1/08; A01K 5/01
[58] Field of Search ............... 119/51.5, 52, 53, 61, 119/18, 27, 20, 10; 248/301, 307, 309, 310, 311, 210, 215, 224, DIG. 7, 311.1; 211/74, 75, 71, 76, 87, 88

[56] References Cited

UNITED STATES PATENTS

| 1,191,184 | 7/1916 | Hooper | 119/61 |
|---|---|---|---|
| 1,719,769 | 7/1929 | Kaufman | 119/18 |
| 2,320,828 | 6/1943 | Murphy | 119/61 |
| 3,462,109 | 8/1969 | Forbes | 248/311 R |
| D228,335 | 9/1973 | Jackson | 248/311 R |

*Primary Examiner*—Louis G. Mancene
*Assistant Examiner*—Peter K. Skiff
*Attorney, Agent, or Firm*—Merchant, Gould, Smith, Edell, Welter & Schmidt

[57] ABSTRACT

Apparatus for use in feeding or watering confined animals comprising a bracket to hold one or more feed buckets on an elevated rail member for engagement by the chest of a feeding animal, the buckets being on the opposite side of the rail from the animal. The bracket includes hoop members to support the rims of feed buckets, hook members aligned with the hoop members to fit over the top edge of a rail member, and lip members extending from the hook members beneath the hoop members for supporting buckets from below, all being rigidly connected together.

1 Claim, 4 Drawing Figures

BRACKET FOR SMALL ANIMAL FEEDER

BACKGROUND OF THE INVENTION

This invention relates to the field of animal husbandry, and particularly to an arrangement for supporting buckets used for feeding confined livestock.

It is well known that at feeding time domestic animals such as horses and cattle are eager and impetuous, so that if their feed bucket is simply placed on the floor within their reach, it is immediately overturned and much of the feed is thus wasted. Various methods of supporting or suspending feed buckets have been tried, and it has been found that a bucket anywhere in the animals stall is quickly damaged by being kicked, stepped or leaned on, butted, and so forth.

It is also well known that much inconvenience accompanies the process of entering each animal's stall in order to position or fill the feed bucket, forcing ones way past the restless animal in each direction of movement through the stall.

Finally, it is well known that for some animals it is desired to keep water, for example, before them at all times. This of course prolongs the interval during which the container or bucket is exposed to damage.

SUMMARY OF THE INVENTION

I have invented an arrangement for use in tending livestock confined in stalls. It is designed to make use of inexpensive platic buckets, such as are used in delivering a large number of various materials, in addition to using the conventional metal buckets. The arrangement includes a bracket for supporting one or more buckets in position for convenient use by the animal in a stall and yet out of reach of the animal's feet or body to prevent damage to the bucket. The bucket is on the opposite side of a rail member from the animal: the body forces of the animal are spent against the rail, and the buckets cannot readily be dislodged by the animal. If a narrow feeder aisle is provided past all the stalls, the husbandman need never enter the animal stalls for feeding or watering, saving time, increasing convenience, avoiding spillage, and reducing replacement costs for buckets.

Various advantages and features of novelty which chracterize my invention are pointed out with particularlity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
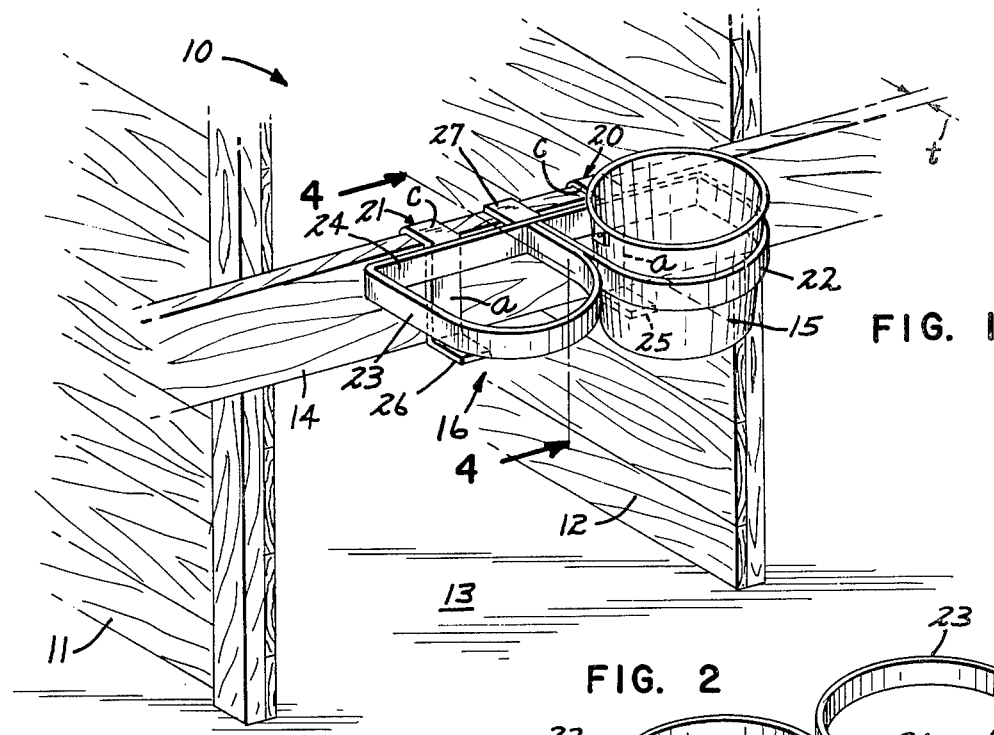
FIG. 1 is an isometric showing of my invention in use.
Figure 2:
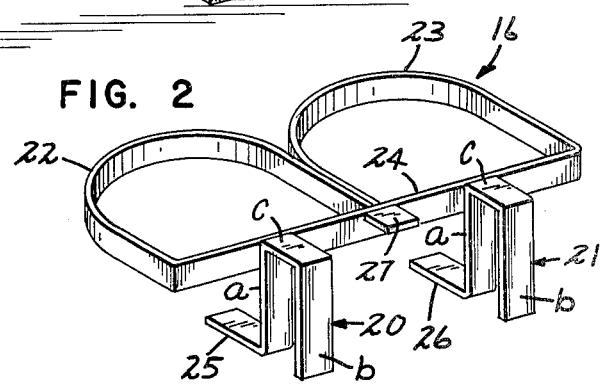
FIG. 2 is an isometric view of the mounting bracket of my invention alone.
Figure 3:
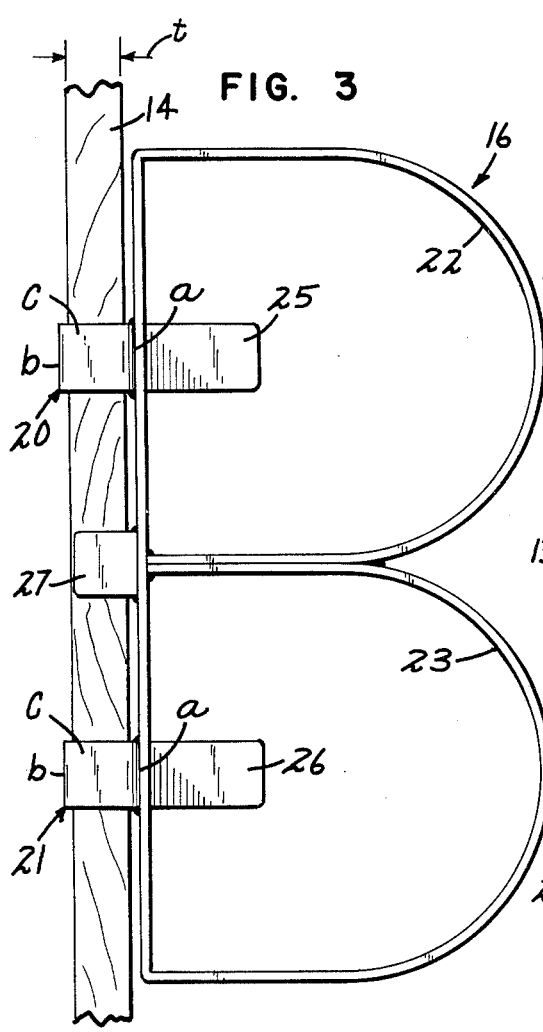
FIG. 3 is a fragmentary plan view of the structure shown in FIG. 1, portions thereof removed for clarity of illustration.
Figure 4:
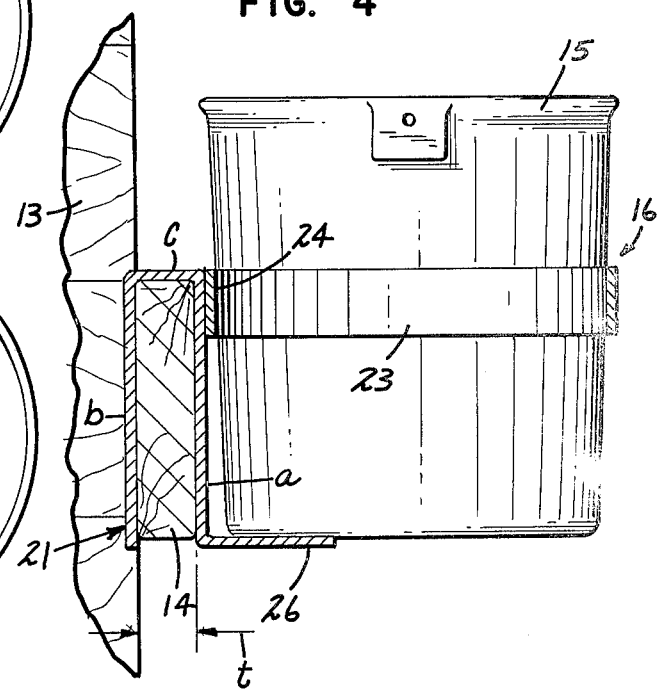
FIG. 4 is a fragmentary vertical section taken along the line 4—4 of FIG. 1.

In FIG. 1, the stall 10 for confining a domestic quadruped such as a horse or a cow is shown to comprise a pair of sidewalls 11 and 12 and a floor 13. A rail member 14, such as a plank or a pair of vertically spaced pipes, is secured to the ends of the walls by any conventional means not shown. One or more buckets 15 are supported, on the side of the rail member 14 remote from the animal, by a mounting bracket 16 movable along and removable from the rail member.

Bracket 16 is shown to comprise a pair of hook members 20 and 21, each including a pair of spaced parallel leg portions $a$, $b$, joined by a body portion $c$. The leg portions are spaced by the thickness $t$ of rail member 14. A pair of hoop members 22 and 23 are secured to and may be integral with a longitudinal bar 24. Hook members 20 and 21 are secured to bar 24, which engages leg portions $a$ orthogonally near body portions $c$, so that the hook members aligned with the hoop members.

Secured to or integral with the leg portion of hook members 20, 21, at their free ends are lip members 25 and 26. They extend away from the hook members in the same direction as hoop members 22, 23. Since the hook members are aligned with the hoop members, an object such as a bucket positioned within a hoop member may rest on a lip member therebelow.

It will be evident that my structure is adapted to the use of any number of buckets simply by selecting the required number of hoop, hook, and lip members. For additional strength, a tap 27 may be secured to bar 24 between each two hook members, to rest on the top of rail member 14 just as do the body portions of the hook members.

In use, bracket 16 is installed on a rail member 14 by passing the hook members 20 and 21 downwardly over the rail member, and is positioned along the rail as desired. Ordinarily, it is not necessary to fasten the bracket to the rail member to hold it against sliding therealong, but this may be done if desired. Note that the hoop members are on the side of the rail member away from the animals, and preferably in a feed aisle to be used by the husbandman in supplying feed and water to the animals. By this arrangement, buckets placed in the hoop member can easily be eaten from by the animals, but are not easily dislodged from their positions.

From the foregoing, it will be evident that I have invented a new and more convenient and economical apparatus for feeding confined animals, including a mounting bracket for plural buckets which supports the buckets for convenient use by the animals and convenient service by the husbandman, while protecting them against dislargement and damage.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim:

1. A mounting bracket comprising, in combination:

a pair of hook members each in the form of an inverted U sized to fit over the upper edge of a rail member and comprising a pair of spaced leg portions joined by a body portion;

a bar secured orthogonally at spaced points therealong to first legs of said hook members near said body portions;

hoop members secured to said bar in side-by-side relation to extend from said bar in a direction away from said hook members;

lip members secured to said first legs of said hook members near the free ends thereof to extend in the same direction of said hoop members, so that an object such as a feed bucket placed within a hoop member may rest on a lip member;

and means secured to said bar between said hook members and extending from said bar in the direction of the bodies of said hooks, for resting on the top of a rail member.

* * * * *